United States Patent [19]

Sakakibara et al.

[11] 4,185,125
[45] Jan. 22, 1980

[54] METHOD OF FRYING RAW NOODLES IN A PERFORATED CONTAINER

[75] Inventors: Sakuichi Sakakibara, Uozaki-Kita; Ko Sugisawa; Takashi Kimura, both of Nara; Teruo Yasukawa, Sakai; Kikuo Matsushima, Ikoma, all of Japan

[73] Assignee: House Food Industrial Company Ltd., Osaka, Japan

[21] Appl. No.: 819,284

[22] Filed: Jul. 27, 1977

[30] Foreign Application Priority Data

Jul. 27, 1976 [JP] Japan .................................. 51/088659

[51] Int. Cl.² .............................................. A23L 1/16
[52] U.S. Cl. ...................................... 426/439; 99/450; 426/557; 426/451
[58] Field of Search ............... 426/438, 439, 403, 440, 426/441, 451, 458, 557, 113, 808; 99/450, 403

[56] References Cited

U.S. PATENT DOCUMENTS

| | | | |
|---|---|---|---|
| 1,228,816 | 6/1917 | Knackstedt | 99/450 |
| 1,331,753 | 2/1920 | Gammel | 426/451 |
| 1,470,521 | 10/1923 | Combest | 99/450 |
| 2,393,420 | 1/1946 | Scheuplein | 99/403 |
| 2,639,659 | 5/1953 | Fry | 99/450 |
| 3,199,438 | 8/1965 | Myler et al. | 99/450 |
| 3,722,402 | 3/1973 | Plumley | 99/450 |
| 3,860,735 | 1/1975 | Hoshino | 426/458 |
| 3,892,874 | 7/1975 | Ando | 426/439 |
| 3,997,676 | 12/1976 | Ando | 426/439 |

FOREIGN PATENT DOCUMENTS

| | | | |
|---|---|---|---|
| 2230698 | 1/1974 | Fed. Rep. of Germany | 426/557 |
| 45-14115 | 5/1970 | Japan | 426/557 |

*Primary Examiner*—S. Leon Bashore
*Assistant Examiner*—Steve Alvo
*Attorney, Agent, or Firm*—Toren, McGeady and Stanger

[57] ABSTRACT

A method for frying noodles in a perforated container having the shape of a cylinder, prism or truncated cone or pyramid and a height of more than 3 cm and being sealed by a perforated cover, the perforations constituting 5 to 30% of the area of the cover. Noodles are fried in such a container after the individual raw noodles have been forced apart and cut, the container is charged with the cut noodles and covered, and the covered container is immersed in hot oil. The noodles are fried in the sealed container in the hot oil at a temperature of 130° C. to 160° C.

2 Claims, 5 Drawing Figures

METHOD OF FRYING RAW NOODLES IN A PERFORATED CONTAINER

The present invention relates to an improved perforated container for frying noodles and a method of frying the noodles in such a container.

In the manufacture of instant fried noodles, a dough is prepared from wheat or buckwheat flour which is kneaded with Kansui (a mixture of alkali metal carbonates and phosphates), seasoning and water, rolled into a sheet, and the sheet is cut into strips having a typical width of 1-2 mm. The raw noodles so obtained are usually folded over without forcing apart the individual noodles, packed in a shallow container, steamed and thereafter fried in oil to remove most of the water and to stabilize the starch in the noodles. The individual noodles stick to each other during steaming and the noodles are fried almost uniformly.

On the other hand, if the noodles are packed in a container of considerable depth, i.e. which is deeper than wide, and having the shape of a cylinder, a truncated cone or pyramid, or a prism, they are forced apart before they are packed in the container, and then fried in hot oil. In conventional containers of this type, the noodles are not fried uniformly even if the individual noodles are first forced apart.

When the noodles are fried in hot oil, he water evaporates violently from the noodles and the vapor pushes the dehydrated noodles located at the top of the container up against the cover. The noodles located at the top of the container stick to each other and form a compact lump, while the noodles located at the bottom of the container separate from each other and are overdone or actually scorched. A compact lump of noodles is not reconstituted adequately by immersing it in hot water, since the water does not penetrate into the lump uniformly and adequately. The overdone or scorched noodles located at the bottom of the container are also not reconstituted sufficiently by subsequent boiling and have an unfavorable taste. When noodles fried to different degrees are mixed to obscure the inhomogeneity of the batch, the taste of the reconstituted mixed batch is unfavorably affected.

The dehydrated noodles in the perforated container are molded into a lump having the same shape as the container. They are usually dropped out of the container onto a conveyor belt and are transferred to packaging machinery where the shaped lumps of solid noodles are packed in suitable containers for consumers having nearly the same shape as the frying containers, and in which they are sold as instant noodles.

The overdone, scorched or loosely separated part of the dehydrated noodles is often disintegrated into powder or particles during transportation and packaging.

The inhomogeneity of irregularly layered dehydrated noodles is caused mainly by frying a body of layered raw noodles having a thickness of more than 3 cm and becomes even more evident when the body of noodles has a thickness of more than 5 cm.

It is an object of this invention to provide means and a method for uniformly frying instant noodles and for producing dehydrated noodles which can be stored for extended periods of time, which are not damaged in transportation, and which become soft and edible again when immersed in boiling water for about three minutes.

The above and other objects and advantages are accomplished in accordance with one aspect of the invention by placing the raw noodles for frying into a perforated container having the shape of a cylinder, prism or truncated cone or pyramid and a height of more than 3 cm and sealingly engaging an open top of the perforated container with a perforated cover, the perforations constituting 5 to 30% of the area of the cover.

According to another aspect of the present invention, the individual raw noodles are first forced apart and cut, the separated, cut noodles are then charged into the container, the container is sealingly engaged with the cover, the covered container is immersed in hot oil having a temperature of 130° C. to 160° C., and the noodles are fried in the covered container.

The above and other objects, advantages and features of this invention will readily be appreciated as the same becomes better understood by reference to the following detailed description of presently preferred embodiments thereof when considered in connection with the appended drawing in which.

Figure 1:
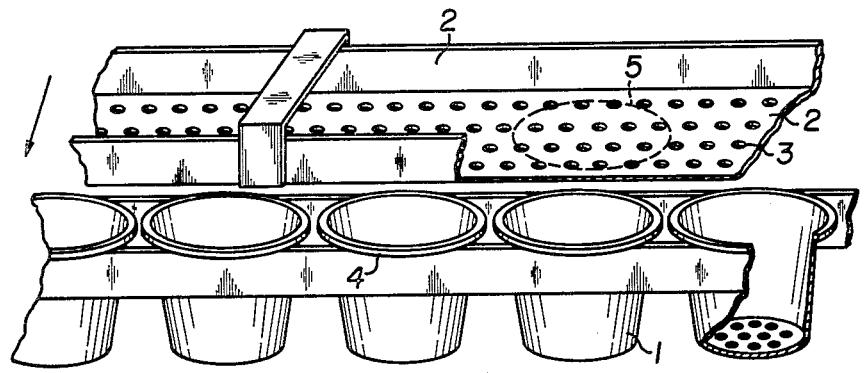
FIG. 1 is a partial perspective view of an otherwise known frying apparatus for noodles, showing the perforated containers and cover of the invention, the latter being illustrated spaced from the containers.
Figure 5:
FIG. 5 shows perspective views of various container shapes.
Figure 5:
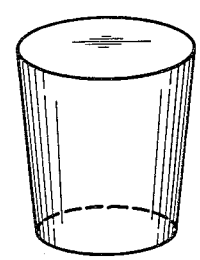
Figure 5:
Figure 5:
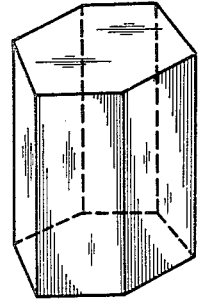
Figure 5:
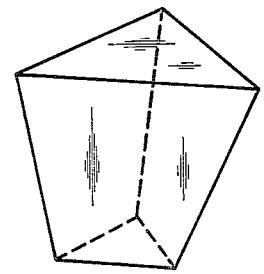
Figure 5:
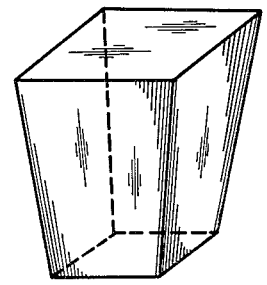

Referring now to the drawing and first to FIG. 1, perforated containers 1 show the embodiment of the present invention wherein the containers have the shape of a truncated cone. The same effect will be obtained with containers having any of the shapes illustrated in FIG. 5 or like prismatic bodies. While FIG. 1 shows perforated cover 2 spaced from the series of containers 1, the cover sealingly engages each container in any suitable manner after the container has been charged with the noodles and before it is immersed in hot oil for frying in a manner well known per se.

In frying apparatus described and illustrated in U.S. patent application Ser. No. 681,437, filed Apr. 29, 1976 and now abandoned, whose disclosure is incorporated herein by reference, for example, perforated containers in an arrangement like that shown in FIG. 1 are charged with raw noodles and are engaged sealingly with a perforated belt of a general type similar to cover 2, the sealed containers being conveyed through a hot oil bath. While being conveyed through the hot oil, the noodles are fried in their containers.

The containers in the prior patent application are shallow pan-like receptacles and thus differ from deep containers 1 which have a height of more than 3 cm. Also, perforations 3 in cover 2 are so dimensioned and distributed over area 5, which forms the cover for each container, that the perforations constitute 5% to 30% of that area.

Figure 2:
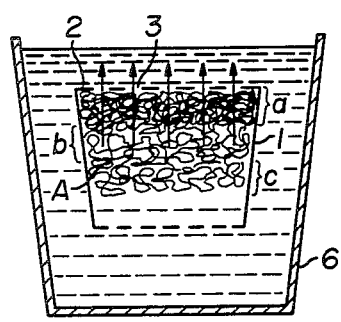
FIG. 2 shows the state of the noodles in a container in hot oil, with a cover whose perforations constitute more than 30% of the cover area.
Figure 3:
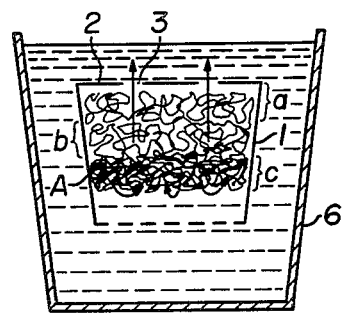
FIG. 3 is similar to FIG. 2, the cover having perforations constituting less than 5% of the cover area.
Figure 4:
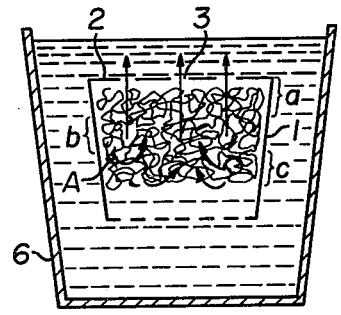
FIG. 4 is similar to FIG. 2, the cover having perforations constituting 5% to 30% of the cover area.

The criticality of this parameter is illustrated in FIGS. 2 to 4. If the perforations constitute more than 30% of cover area 5, as shown in FIG. 2, the individual noodles at the top will be pushed upwards against the cover by the violent evaporation of water from the noodles, as indicated by the plurality of vertical arrows, to form a dense portion a of the lump A of noodles in the container, layers b and c of the dehydrated noodles differing therefrom in density, so that a non-homogeneous mass is formed. In case the perforations in the cover constitute less than 5% of the area, as shown in FIG. 3, water evaporation will be inhibited, as shown by the few vertical arrows, causing the lowest layer c to be solidified densely before the lump A of the noodles expands and solidifies evenly. Thus, in either case, it is impossible to obtain a uniform density of the dehydrated noodles, with a concomitant failure to obtain uniform dehydration. A prolonged period of frying is required.

On the other hand, as shown in FIG. 4, if the range of the percentage of perforations in the cover is selected in accordance with the invention, the evaporation of water proceeds not only upwardly at a somewhat restricted rate but also somewhat downwardly and horizontally, causing the lump A of the noodles to expand during dehydration in all directions more or less uniformly. Therefore, the noodles are solidified uniformly, without substantial layering, and homogenously dehydrated noodles are obtained.

Perforations 5 are preferably distributed evenly over the cover area and the perforations are so dimensioned as to permit passage of the hot oil therethrough while substantially preventing escape of noodles from the sealed container. If desired, not only the bottom but also the side walls of the container may be provided with like perforations.

As previously indicated, while the perforated container and cover may be used in a frying apparatus of the type described and illustrated in U.S. patent application Ser. No. 681,437, conveyance through the hot oil bath and/or sealing of the containers by the cover may be effected in any suitable manner.

The strips of raw noodles prepared according to the afore-mentioned procedure are steamed on a conveyor, and the steamed noodles are then forcibly separated from each other. The separated noodles are cut into one serving, packed in a container or mold having one of the various shapes indicated hereinabove and made of materials resistant to hot oil, such as stainless steel, and covered with the perforated cover. They are then immersed in hot oil and fried at 130° C.–160° C.

When the temperature of oil is below 130° C., the water in the noodles evaporates too slowly and the noodles do not float upwardly. They are dehydrated and solidified slowly and the upper portion of the lump of noodles is less dense than the lower portion. It takes an excessively long time to complete the dehydration.

When the temperature is more than 160° C., the violent evaporation of water pushes the upper portion of the noodles upwardly and the upper portion of the lump is denser than the lower portion.

The preferred range of perforations in the cover is 15% to 25% of the cover area while the preferred drying temperature is in the range of 145° C. and 160° C.

The noodles may be forced apart before cutting by various methods.

For example, the noodles may be stretched and separated by continuously transferring the noodles from a slowly moving conveyor to a rapidly moving one, or by hanging the noodles from the end of the conveyor. They are stretched and separated owing to the weight of noodles themselves.

The fried and dehydrated lump of noodles having the shape of the frying container may be dropped out of the container onto a conveyor, cooled and there packed in a similarly shaped container made of paper, synthetic resin or the like, suitable for sale to consumers.

The lump of noodles prepared according to the method of the invention is dehydrated uniformly, and all portions of the lump have substantially the same structure. Since there are nearly the same spaces among individual noodles in every portion of the lump, when the boiling water is added to the lump, it can penetrate uniformly into every portion of the lump and the lump is reconstituted uniformly in a few minutes.

The following comparative tests were made in connection with the reconstitution of fried noodles.

100 parts by weight of wheat flour, 1.5 parts of sodium chloride and 32 parts of Kansui were mixed and kneaded, rolled into a sheet and cut into strips having a thickness of 0.9 mm by a conventional method. The strips so obtained were transferred onto a conveyor where they were steamed and then transferred to a second conveyor which moved faster than the first one. The raw noodles were forced apart and separated, cut into 80 g of noodles and each batch was packed in a container having the shape of a truncated cone 6 cm tall. The frying container was covered sealingly with a cover of various perforations and the noodles were fried. The lump of dehydrated noodles was 5.5 cm tall and contained 3% of moisture.

It was packed in a container of like shape, filled with boiling water and was left standing for 3 minutes. The dipped lump of noodles was transferred into a perforated trough where the water was drained.

The weight of the reconstituted noodles and the status of the noodles were observed. The weight of noodles before reconstitution was illustrated as 1.

| Weight of noodles before reconstitution | 1 | 1 | 1 | 1 |
|---|---|---|---|---|
| after reconstitution | 2.24 | 2.11 | 2.29 | 2.16 |
| perforation of cover % | 5 | 43 | 30 | 43 |
| frying temperature °C. | 160 | 160 | 130 | 130 |
| status of fried noodles | homogeneous | unhomogeneous | homogeneous | unhomogeneous |

The reconstituted noodles having a weight of 2.11 and 2.16 must be dipped further in boiling water for one minute in order to obtain reconstituted noodles having a weight of 2.24 and 2.29, respectively.

As mentioned above, the fried and dehydrated noodles prepared according to the method of the invention have a uniform structure. They are reconstituted uniformly and more rapidly than the conventional ones, and even the lower portion of the lump of the noodles are not damaged during transportation and packaging, thus preventing any substantial loss of yield.

EXAMPLE 1

To 100 parts of weight of wheat flour, 31 parts by weight of Kansui was added. The mixture was kneaded intimately to obtain a dough.

A 0.9 mm thick sheet was made from the dough by a five-stage roller and then strips were obtained by cutting the sheet with a cutting roller. The strips were placed on a conveyor and steamed. The steamed noodles were transferred to a second conveyor moving more rapidly than the first one where the individual noodles were forced apart and separated from each other and cut into 80 g batches of noodles. They were packed in a container of 6 cm height and having the shape of a truncated cone. The container was covered sealingly with a perforated cover having a perforation rate of 20%, and was immersed in hot oil. It was fried in the oil at 150° C. for 1 minute and 30 seconds. The lump of dehydrated noodles thus obtained was 5.5 cm tall and all portions of the noodle lump were dehydrated uniformly. The structure of the lump was uniform and no dense or coarse portion was found in the lump.

EXAMPLE 2

The steamed noodles prepared by the method described in Example 1 were hung at the end of the transportation conveyor. The elongated and forced apart noodles were cut into 80 g batches of noodles. They were packed in a container of 3.5 cm height, having the shape of a truncated pyramid. The container was covered with a perforated cover having a perforation rate of 10% and was immersed in hot oil. It was fried in the oil at 145° C. for 1 minute and 45 seconds. The lump of dehydrated noodles thus obtained was 3 cm tall and the structure of the lump was uniform.

What we claim is:

1. A method of frying raw noodles, comprising the steps of forcing apart the raw noodles to provide a mass of individual, separated raw noodles, cutting the mass of the individual, separated raw noodles, charging the cut mass of the individual, separated raw noodles into a perforated container having a height of more than 3 centimeters and the shape of a truncated cone or pyramid, a cylinder or a prism, sealingly engaging a cover with the charged container, the cover having perforations constituting from 5 to 30% of the area of the cover, immersing the charged container with the sealingly engaged cover in hot oil having a temperature of 130° C. to 160° C., and frying the raw noodles in the hot oil to produce a homogeneous mass of fried and dehydrated noodles.

2. The method of claim 1, wherein the temperature is at least about 145° C.

* * * * *